United States Patent Office 2,918,505
Patented Dec. 22, 1959

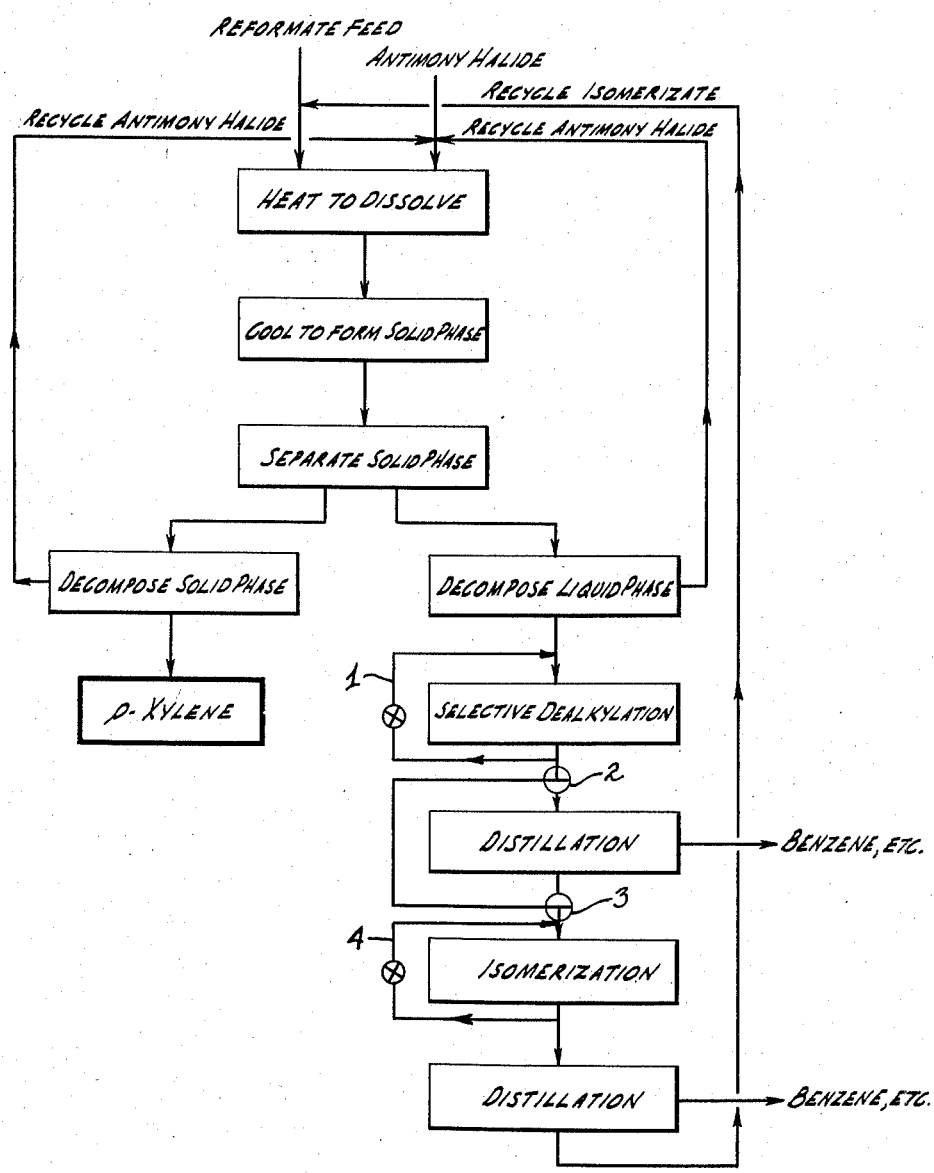

2,918,505

MANUFACTURE OF PARA-XYLENE

Carleton B. Scott, Pomona, William D. Schaeffer, Ontario, and Thomas F. Doumani, Whittier, Calif., assignors to Union Oil Company of California, Los Angeles, Calif., a corporation of California Application November 2, 1953, Serial No. 389,623

20 Claims. (Cl. 260—672)

This invention relates to the manufacture of para-xylene, and in particular relates to an improved method for the preparation and separation of para-xylene from petroleum hydrocarbon reformates comprising isomeric xylenes and ethylbenzene.

At the present time petroleum hydrocarbon reforming operations are widely employed to produce aromatic hydrocarbons such as benzene, xylenes, ethylbenzene, cumene, etc. The mixed product obtained can readily be fractionally distilled to obtain fractions comprising compounds having the same molecular weight, but in most instances such fractions cannot be separated into their components by conventional fractional distillation procedures. For example, the $C_8$ fraction of a typical reformate has a boiling range of about 136° to 145° C., and for the most part comprises ortho-, meta-, and para-xylenes and ethylbenzene, all of which have boiling points within about 8° C. of each other. Two of the isomers, meta- and para-xylene, boil within about 0.5° C. of each other. Of the components of such mixture, para-xylene is by far the most valuable since it alone can be readily oxidized to form terephthalic acid which is widely used in large quantities in dyestuff and synthetic resin manufacture. Various methods have been proposed for separating the para-xylene from reformates, e.g., by fractional crystallization, and/or for converting the other components of reformate fractions into para-xylene, but none of such methods have proved entirely satisfactory for large-scale commercial operation.

In the co-pending application of Schaeffer et al., Serial No. 352,582, filed May 1, 1953, and now abandoned, there is disclosed a process for separating para-xylene from mixtures comprising isomeric xylenes and ethylbenzene wherein the mixture is treated with an antimony halide to form addition compounds or complexes between the hydrdocarbon components of the mixture and the antimony halide, and said complexes are separated by fractional crystallization at more or less ambient temperatures. The para-xylene complex is readily separated as a solid phase at temperatures between about 0° C. and about 40° C., and the hydrocarbon may be recovered from its association with the metal salt by simple distillation of the complex. Said co-pending application further discloses that the liquid complexes of ortho- and meta-xylenes and ethylbenzene may likewise be decomposed and the hydrocarbons recovered therefrom by distillation, and the mixture of hydrocarbons so obtained may be subjected to isomerizing conditions to form a further quantity of para-xylene which can be separated from the isomerizate by treatment with an antimony halide as previously described. By operating the separation and isomerization steps in sequence with continuous recycling of the isomerizate to the separation step, the ortho- and meta-xylene components of the original reformate can be isomerized to extinction and para-xylene can be obtained as the sole $C_8$ product.

The present invention is based on the discovery that in the aforementioned cyclic process involving separation of the para-xylene from the reformate and isomerization of the reject stream comprising ortho- and meta-xylenes and ethylbenzene, greatly improved results can be attained by removing the ethylbenzene from the reject stream prior to subjecting the latter to isomerizing conditions. Apparently, under the isomerizing conditions employed, the presence of ethylbenzene causes various dealkylation and transalkylation or disproportionation reactions to occur which result in the formation of an isomerizate which does not lend itself to completely satisfactory treatment with an antimony halide for the separation of its para-xylene content. We have further found that removal of the ethylbenzene from the reject stream prior to the isomerization step may be advantageously effected by subjecting said stream to dealkylating conditions whereby the ethylbenzene is selectively dealkylated to ethane and benzene, with the xylene components of the stream being left substantially unchanged. The benzene can readily be removed from the dealkylated product by simple distillation.

The present invention thus consists in the process for obtaining para-xylene from a $C_8$ petroleum hydrocarbon reformate fraction comprising ortho-, meta-, and para-xylenes and ethylbenzene wherein (1) a feed mixture comprising said reformate and a recycle stream is treated with an antimony halide to form complexes with the hydrocarbon components of the feed mixture; (2) the para-xylene complex is separated as a crystalline solid by cooling the mixture of complexes to a suitable temperature, (3) the liquid complexes are decomposed to recover therefrom a reject stream comprising ortho- and meta-xylene and ethylbenzene, (4) said reject stream is subjected to dealkylation whereby the ethylbenzene is selectively dealkylated to benzene and/or toluene and the ortho- and meta-xylenes remain substantially unchanged, (5) the ortho- and meta-xylenes are subjected to isomerization whereby there is obtained an isomerizate comprising ortho-, meta- and para-xylenes, and (6) said isomerizate is returned to step (1) as said recycle stream.

The process of the invention is illustrated in one embodiment by the single figure of the drawing which forms a part of this specification and which takes the form of a diagrammatic flow-sheet. Referring to said drawing, fresh reformate feed comprising ortho-, meta- and para-xylenes and ethylbenzene plus a recycle isomerizate stream comprising the three xylenes are introduced into a suitable vessel together with fresh antimony halide plus recycle antimony halide. Within said vessel the mixture is heated to a temperature sufficient to attain the formation of a single liquid phase comprising addition compounds or complexes between the hydrocarbons and the antimony halide. The liquid mixture of complexes is then passed to a cooling zone wherein it is cooled to a temperature such that there is formed a solid phase consisting of an addition compound or complex between para-xylene and the antimony halide. The two-phase mixture is then passed to separating means, such as a rotary filter, wherein the phases are separated. The solid phase is passed to a decomposition zone, which may take the form of a simple distillation column, wherein the complex is decomposed to form para-xylene and antimony halide, with the latter being recycled back to the dissolving step and the para-xylene being sent to storage as finished product. As is hereinafter more fully explained, the para-xylene may be subjected to a secondary antimony halide treatment when an especially pure product is desired.

The liquid complexes withdrawn from the separating means are similarly decomposed to separate the antimony halide from the hydrocarbons, and the antimony halide stream from this operation is likewise returned to the initial dissolving step. The hydrocarbons, comprising ortho- and meta-xylenes and ethylbenzene, are passed to a dealkylation zone wherein the ethylbenzene is catalytically dealkylated to form ethane and benzene. The dealkylation is preferably a recycle operation with a substantial portion of the dealkylated product being returned to the reaction zone via line 1. The ethane is taken off as a gas, and according to one mode of operation the dealkylated product is distilled to effect removal of the benzene. The benzene-free product, comprising ortho- and meta-xylenes, is then passed to an isomerization pone wherein the two xylenes are catalytically isomerized to form a mixture of ortho-, meta- and para-xylene which is returned as the recycle stream to the initial dissolving step. Such mode of operation is attained by suitably positioning valves 2 and 3. According to an alternative and preferred mode of operation, effected by positioning of valves 2 and 3, as shown, the benzene component of the dealkylated product is allowed to remain in the system until after completion of the isomerization step whereupon it is removed from the isomerizate prior to return of the xylene isomers to the initial dissolving step. The isomerization step is preferably conducted as a recycle operation with a portion of the isomerizate being returned to the reaction zone via line 4.

From the foregoing general description of the process of the invention, it will be seen that the process consists of three basic operations:

(1) Seperation of para-xylene from a reformate stream comprising ortho-, meta-, and paraxylenes and ethylbenzene.

(2) Dealkylation of the ethylbenzene contained in the reject stream.

(3) Isomerization of the ortho- and meta-xylenes and return of the isomerizate to the initial separation operation.

Considering these basic operations in detail:

THE SEPARATION OPERATION

The separation operation consists in separating para-xylene from the feed and recycle streams by treatment with an antimony halide. This operation is described and claimed in the aforesaid co-pending application of Schaeffer et al., and essentially comprises dissolving an antimony halide in the hydrocarbon mixture, lowering the temperature of the resulting solution to a value at which there is formed a solid phase comprising the antimony halide and the components of the hydrocarbon mixture and separating said solid phase from the solution. In the solid phase, the ratio of para-xylene to the other components of the hydrocarbon mixture is substantially higher than the ratio thereof in the feed stream. The solid phase decomposes into its hydrocarbon and antimony halide components upon heating, and accordingly by subjecting the solid phase to simple distillation a hydrocarbon stream enriched in para-xylene is recovered as an overhead fraction with the antimony halide being obtained as distillation bottoms. The liquid phase may be similarly decomposed by distillation to recover an overhead stream which is lean in para-xylene. In a single-pass operation, the para-xylene content of a typical $C_8$ reformate may be raised from about 20 percent by volume to about 75 percent by volume. Para-xylene of higher purity can be obtained by subjecting the enriched stream to a second antimony halide treatment. Any number of treatments, arranged if desired in conventional cascade fashion, may be employed to produce the para-xylene in any desired degree of purity.

Either antimony trichloride or antimony tribromide, or mixtures thereof, in either technical or reagent grades are employed as the antimony halide, with antimony trichloride being preferred by reason of its lower cost and lower melting point. The amount in which the antimony halide is employed depends somewhat upon the proportion of para-xylene in the hydrocarbon mixture being treated, and in general is equivalent to between about 0.5 and about 10 moles, preferably between about 1 and about 5 moles, of antimony halide per mole of para-xylene in the feed mixture.

The initial step of the operation consists simply in admixing the antimony halide with the hydrocarbon feed mixture at such temperature that the antimony halide dissolves to form a single liquid phase. Such temperature is usually between about 40° C. and about 90° C., depending upon the composition of the feed mixture and the amount and identity of the antimony halide employed. Inasmuch as the mixture must subsequently be cooled, greatest heat economy will be obtained by dissolving the antimony halide in the hydrocarbon feed mixture at the lowest temperatures possible. The hydrocarbon feed mixture may be heated to the required temperature prior to adding the antimony halide, or the two may be admixed at room temperature and the resulting mixture then heated until a single liquid phase is formed.

The temperature to which the single liquid phase must be cooled to effect separation of the solid phase comprising the addition compound or complex of para-xylene depends upon a number of factors. As in substantially all crystallization operations, the material which initially crystallizes out of solution is the purest, and the maximum quantity of crystallized material is obtained only at a sacrifice in purity. Accordingly, if it is desired to operate the present process to obtain the para-xylene component of the feed mixture in a high state of purity, but in decreased yield, the liquid mixture of hydrocarbon and antimony halide will be cooled only sufficiently to produce a relatively small quantity of crystals. On the other hand, if it is desired to effect a greater recovery of para-xylene at a sacrifice in purity, the mixture may be cooled to a much lower temperature before separating off the solid phase. The temperature at which separation of the solid phase is effected also depends upon the composition of the hydrocarbon mixture and the identity and amount of the antimony halide employed. Thus, higher temperatures are employed when the feed mixture contains a relatively high proportion of para-xylene and/or the antimony halide is antimony trichloride. In general, however, the temperature to which the liquid mixture is cooled will be between about 0° C. and about 70° C., usually between about 10° C. and about 40° C., depending upon the foregoing factors.

Separation of the crystalline solid phase from the cooled mixture may be carried out in any of the conventional ways, e.g., by filtration, centrifuging, or in some cases by settling and decantation. The crystals are of relatively large size and settle rapidly, and no difficulty is encountered in separating them from the liquid by simple filtration.

Both the solid and liquid addition compounds or complexes decompose readily at relatively low temperatures, e.g. 40°–125° C., and the hydrocarbon components of each phase may be recovered in free form by simple distillation, either at atmospheric or reduced pressures. Since both antimony trichloride and antimony tribromide have boiling points considerably higher than any of the hydrocarbon components of the feed mixture, the latter will be obtained as an overhead fraction and the antimony halide will be obtained as distillation bottoms. The distillation of each phase may be satisfatcorily carried out at 130°–150° C. under atmospheric pressure, or at considerably lower temperatures under reduced pressure, and in each case the bottoms fraction containing the antimony halide is returned to the initial admixing step to be re-used in the separation operation.

The overhead fraction obtained by distilling the solid complex is enriched in para-xylene, and, as previously explained, may be passed directly to storage or may be treated with a further quantity of antimony halide to effect further concentration and purification of the para-xylene. If desired, a portion of the para-xylene product may be recycled back and admixed with the hydrocarbon feed mixture for the purpose of pre-enriching said mixture in para-xylene.

The overhead fraction obtained by distilling the liquid complex, herein termed the "reject stream," is enriched in ortho and meta-xylenes and ethylbenzene, and is employed directly as the feed stream for the dealkylation operation.

As will be apparent to those skilled in the art, the separation operation may be carried out batch-wise or continuously with periodic or continuous recycling of the antimony halide from the final recovery step back to the initial admixing step. Like other separation operations, it may be carried out in a plurality of stages arranged in cascade fashion. Also, the hydrocarbons may be recovered from their association with the antimony halide in the solid and liquid phases by methods other than distillation, e.g., by selective solvent extraction.

THE DEALKYLATION OPERATION

The second basic operation in the present process consists of removing the ethylbenzene component of the reject stream by selective dealkylation. This operation is preferably of the hydrodealkylation type wherein the feed stream is treated with hydrogen at a high temperature in the presence of a hydrogenation catalyst and an inert diluent gas. By suitably correlating the temperature, pressure, liquid hourly space velocity, and amounts of hydrogen and diluent gas, the dealkylation reaction may be controlled so as to be effective substantially only with respect to the ethylbenzene, leaving the xylenes essentially unaffected.

According to such preferred method of carrying out the dealkylation step, the feed stream is vaporized and admixed with an inert diluent gas and either hydrogen or a hydrogen donor, and is contacted with a hydrogenation catalyst at a temperature between about 450° and about 550° C. The contact time, measured in terms of liquid hourly space velocity (LHSV), may be varied between about 1.0 and about 10 volumes of feed per volume of catalyst per hour, and is preferably between about 3.0 and about 8.0. The pressure may range from 0 to 2000 or more p.s.i.g., but is preferably between about 150 and about 1000 p.s.i.g. The amount of hydrogen employed ranges from about 0.5 to about 10, preferably from about 1.0 to about 5.0, moles per mole of ethylbenzene in the feed stream, and the diluent gas is employed in an amount representing between 1.0 and about 10.0 moles per mole of ethylbenzene in the feed stream.

The catalyst employed may be any of the recognized class of hydrogenation catalysts. For the most part such class consists of the metals of groups VI–B and VIII of the periodic table and their oxides, e.g., chromium, molybdenum, tungsten, uranium, iron, nickel, ruthenium, rhodium, palladium, osmium, iridium, and platinum, and the oxides of such metals. The catalyst may be unsupported or supported on conventional carrier materials, e.g., alumina, silica gel, magnesia, thoria, bauxite, montmorrillonite, etc. Supported catalysts may be prepared either by impregnation or precipitation methods, and materials such as silica, cobalt, nickel, alkali-metal oxides and hydroxides may be employed as promoters. A particularly effective catalyst is one prepared by impregnating an activated silica-modified alumina gel with an aqueous solution of ammonium molybdate, drying and calcining the impregnated carrier, impregnating with aqueous cobaltous nitrate, and again drying and calcining. The catalyst may take various physical forms, e.g., beads, pellets, granules, etc., depending upon the particular technique employed in the contacting operation.

Hydrogen may be supplied to the dealkylation operation as such or in the form of a hydrogen donor, i.e., in the form of a material which loses hydrogen under the conditions of operation, thereby generating the hydrogen in situ. Cycloaliphatic hydrocarbons such as cyclohexane and methylcyclohexane are particularly useful hydrogen donors since they dehydrogenate to form compounds identical with those normally present in the dealkylated product.

The use of a diluent gas in the dealkylation operation is particularly advantageous since the presence of such gas promotes the selectivity of the dealkylation reaction and inhibits cracking and rupture of the aromatic nuclei. Any material which exists as a stable gas and which is inert with respect to the other components of the system under the prevailing operating conditions may be employed as the diluent, e.g., nitrogen, methane, helium, carbon dioxide, water vapor, carbon monoxide, and mixtures of the same. Water vapor is preferred, particularly when the hydrogen component of the system is supplied as such rather than in the form of a hydrogen donor.

The dealkylation operation is a typical high temperature gas-solid contacting operation, and any of the techniques conventionally employed for effecting such type of operation may be used. Either a fixed or moving bed operation may be employed. In moving-bed operation, the catalyst in granular, powdered or pelleted form is continuously moved through the reactor, usually by gravity flow, while being contacted concurrently or countercurrently with the gaseous reactant mixture. The product gases and catalyst are removed from the reactor opposite their respective inlets. Heat is supplied to the reactor either by preheating the feed gas mixture or by internal or external heating of the reaction vessel itself. The contact time and reaction temperature may be controlled by suitably adjusting the flow ratio of catalyst and feed gas. The catalyst which is removed from the reaction vessel is usually reheated to the reaction temperature, and recycled back to the vessel. In fixed-bed operation the catalyst is maintained in the form of a plurality of fixed beds which are alternately put on stream and taken out of active service for regeneration or cleaning operations. Heat is ordinarily supplied by external or internal heating, and the operation may be conducted at atmospheric pressures or above. The so-called "fluidized bed" type of operation, which combines certain features of both moving and fixed-bed operations, may also be employed.

In order to confine the dealkylation reaction to the ethylbenzene component of the feed stream and to minimize decomposition of the xylene components, the operating variables and the amounts of hydrogen and diluent gas employed are suitably correlated and the reaction is preferably carried out with low conversion per pass and recycling of a substantial proportion, e.g. 25–75 percent, of the product. A typical set of operating conditions is as follows.

Feed stream:
    Reject stream from separation operation, percent _____ 50
    Dealkylated product, percent _____ 50
Mole ratio $H_2$/ethylbenzene _____ 1.0
Mole ratio steam/ethylbenzene _____ 2.0
Temperature, ° C. _____ 500
Pressure, p.s.i.g. _____ 200
LHSV _____ 7.5

Under such conditions, dealkylation of ethylbenzene occurs substantially exclusively at the aromatic-aliphatic bond to form ethane and benzene. The condensed dealkylated product thus comprises benzene, and meta- and ortho-xylenes, from which the benzene can readily be removed by simple fractional distillation. As previously stated, such distillation step may be carried out prior to the subsequent isomerization operation, i.e., immediately following the dealkylation operation, or the benzene component of the dealkylated product may be allowed to remain therein and to serve as in inert diluent in the isomerization operation, in which case it will be removed by distillation of the isomerizate prior to return of the latter to the initial separation operation.

THE ISOMERIZATION OPERATION

The isomerization operation consists in subjecting the product of the dealkylation operation, either before or after removal of the benzene and toluene components thereof, to catalytic isomerization whereby the meta- and ortho-xylene components of such product are isomerized to an equilibrium mixture of ortho-, meta- and para-xylene, and returning such mixture to the initial separation operation for recovery of the para-xylene content.

A number of processes are known for effecting the catalytic isomerization of xylenes, and any of such processes may be employed in practice of the present invention. In general, such processes comprise contacting the feed mixture, either in the liquid or vapor phase, with an isomerization catalyst at an isomerizing temperature. For the most part, the catalysts employed in liquid phase operation are of the Friedel-Crafts type, e.g. aluminum chloride, boron trifluoride, ferric chloride, zinc chloride, and mixtures of Friedel-Crafts catalysts with hydrogen halides, e.g. mixtures of aluminum chloride and hydrogen chloride, mixtures of boron trifluoride and hydrogen fluoride, etc. The temperature employed is usually between about 25° C. and about 200° C., depending upon the particular catalyst employed and the composition of the feed stream. The pressure may vary from 0 to about 1000 p.s.i.g. or higher, and is conveniently the autogenic pressure of the reaction mixture at the particular reaction temperature employed. Usually, the mole ratio of catalyst to reactant is between about 0.5 and about 10.0. The reaction time will vary depending upon the other operating variables of temperature, pressure and amount of catalyst employed, but is usually between about 5 and about 60 minutes. If desired, an inert reaction medium may be employed, and when the feed stream contains the benzene and toluene which are formed in the dealkylation operation these materials conveniently serve as inert diluents.

When carried out in the liquid phase, the isomerization operation constitutes a simple liquid-solid or liquid-liquid contacting operation, and any of the conventional means for conducting such type of operation may be employed. Usually, the feed stream and catalyst are simply introduced into a suitable reaction vessel, which may be heated externally or internally, and allowed to remain therein with efficient agitation for the period of time required for the isomerization reaction to become complete. Either continuous or batch-wise operation may be employed. Upon completion of the reaction the reaction product is withdrawn from the vessel and processed to separate the catalyst from the isomerizate, e.g. by filtration or distillation. When the catalyst is gaseous at normal temperatures and pressures, e.g. a mixture of boron trifluoride and hydrogen fluoride, it may be separated from the product by evaporation or gas stripping.

The isomerization reaction may also be carried out in the vapor phase in the known manner at temperatures in the range of about 250° C.–600° C. employing solid catalysts of the cracking type, e.g., silica-alumina, silica-zirconia, silica-magnesia, boron oxide, thoria, activated clays alumina-molybdena, etc. Pressures may range from 0 to 500 p.s.i.g., and the space velocity may vary from about 0.1 to 10 liquid volumes per volume of catalyst per hour. If desired, the hydrocarbon feed stream may be diluted with an inert gas, and the operation may be carried out in the presence of added hydrogen. Conventional gas-solid contacting techniques may be employed.

In order to avoid undesirable side reactions, it is preferred to carry out the isomerization reaction as a recycle operation, i.e., by effecting only a relatively low conversion per pass and recycling a substantial portion, e.g. 25–75 percent, of the isomerizate back to the contacting step.

Upon completion of the isomerization reaction, the isomerized product is subjected to fractional distillation prior to recycling in order to remove by-products formed in the dealkylation and isomerization reactions. Accordingly, the final step of the isomerization usually consists in a fractional distillation operation to remove both low- and high-boiling materials, with the recycle stream being taken off as a middle fraction boiling at about 135°–145° C. Said middle fraction is then returned to the initial step of the separation operation for removal of its para-xylene content along with that of the reformate feed. As will be readily apparent, when the process is operated continuously the amount of fresh feed supplied to the separation operation should equal the amount of para-xylene removed from the system as product plus the amount of ethylbenzene which is removed from the system as benzene and toluene and by-products.

The following example will illustrate one way in which the principle of the invention may be applied, but is not to be construed as limiting the same:

Example

A mixture of $C_8$ hydrocarbons obtained by extracting a petroleum hydrocarbon reformate with a glycol, and comprising about 20% by volume of para-xylene, about 65% by volume of ortho- and meta-xylenes, and about 15% by volume of ethylbenzene, is introduced into a reaction vessel along with two moles of antimony trichloride per mole of hydrocarbons. The mixture is heated with stirring to a temperature of about 65° C., whereupon a single liquid phase is formed. The liquid is then cooled to a temperature of about 20° C., and the white crystalline solid which is thereby formed is filtered off and distilled at a temperature of about 115° C. under reduced pressure. The distillate comprises about 77% by volume of para-xylene. The distillate is again treated with antimony trichloride to obtain a final product containing about 94% by volume of para-xylene. The liquid filtrates from both antimony trichloride treatments are combined and distilled, whereby there is obtained a distillate containing about 16% by volume of ethylbenzene, about 75% by volume of ortho- and meta-xylenes and about 9% by volume of para-xylene. This distillate comprises the reject stream from the separation operation, and is passed directly to the dealkylation stage without condensation.

In the dealkylation stage, the reject stream from the separation operation is admixed with an equal volume of a recycle gas, hereinafter identified, and with 1.0 mole of hydrogen and 5.0 moles of steam per mole of ethylbenzene. The vapor mixture is then passed through a vapor heater wherein the vapor mixture is heated to a temperature of about 510° C. The heated vapors are passed through a catalyst vessel maintained under a pressure of about 150 p.s.i.g. and containing a fixed bed of ⅛-inch catalyst pellets consisting of calcined molybdenum oxide supported on an activated alumina-silica carrier. The rate of vapor flow through the vessel is such that the liquid hourly space velocity is about 6.5. The vapor product withdrawn from the vessel is divided in half, one half being returned and admixed with the vaporized reject stream as the recycle gas hereinbefore referred to, and the other half being passed to a distillation column operated to produce a low-boiling fraction comprising the benzene produced in the dealkylation operation, a small high-boiling fraction comprising high-boiling by-products, and a middle fraction distilling at about 130°–150° C. and comprising ortho- and meta-xylene, a small amount of para-xylene, and about 5 percent of ethylbenzene. Said middle fraction comprises the dealkylated product which serves as the feed stream for the subsequent isomerization stage.

Isomerization is effected by introducing the feed stream plus an equal volume of recycled isomerizate, together with about 3.0 moles per mole of feed hydrocarbons of a 30% solution of hydrogen fluoride in boron trifluoride, into a pressure vessel fitted with an agitator and internally mounted heating coils. A temperature of about 110° C. is maintained within the vessel by circulating steam through the heating coil. The pressure within the vessel is the autogenic pressure of the reactants. After a reaction period of about 15 minutes, during which time the reaction mixture and catalyst are continuously agitated, the reaction product is transferred to a stripping column wherein the boron trifluoride and hydrogen fluoride are stripped from the isomerizate with a stream of natural gas. One-half of the stripped product is returned to the reaction vessel as the aforesaid recycle stream, and the remaining half is transferred to a distillation column. A middle fraction distilling at about 135°–145° C. and comprising an equilibrium mixture of ortho-, meta- and para-xylene is taken off as a product stream. A small bottoms fraction, comprising high-boiling by-products is discarded. The middle fraction is condensed and returned to the initial step of the separation stage where it is admixed with the reformate feed stream and the para-xylene content is separated in the next succeeding cycle of operation.

As will be apparent to those skilled in the art, many variations in the separate operations which comprise the process of the invention may be made without departing from the scope thereof, and any of the conventional operating techniques may be employed, particularly insofar as the catalytic dealkylation and isomerization operations are concerned. While the process of the invention has been herein described as being applied to the manufacture of para-xylene from a $C_8$ reformate fraction comprising all three xylene isomers and ethylbenzene, it may be equally well applied to other hydrocarbon mixtures comprising such components or to mixture of para-xylene, ethylbenzene and either ortho- or meta-xylene. Thus, if desired, a feed stream comprising all four components may be initially treated to remove the meta-xylene therefrom, and the resulting mixture of ethylbenzene, para- and ortho-xylene processed as herein disclosed. The isomerization operation in particular lends itself to many variations, and any of the known processes for isomerizing xylenes, employing different operating conditions, liquid or vapor phase operation, and a wide variety of catalysts may be employed.

Other modes of applying the principle of our invention may be employed instead of those explained, change being made in the methods and materials employed, provided the steps stated by any of the following claims or the equivalent of such stated steps be employed.

We, therefore, particularly point out and claim as our invention:

1. The process which comprises (1) admixing a feed stream comprising para-xylene, ethylbenzene and at least one member of the group consisting of meta-xylene and ortho-xylene with a recycle stream hereinafter identified and with an antimony halide selected from the class consisting of antimony trichloride and antimony tribromide at a temperature sufficient to effect the formation of a single liquid phase; (2) lowering the temperature of said liquid phase to a value such that there is formed a solid phase comprising said antimony halide and hydrocarbon components of said feed and recycle streams, the ratio of para-xylene to other hydrocarbon components of said solid phase being substantially higher than the ratio thereof in said feed and recycle streams, and a liquid raffinate phase comprising said antimony halide and hydrocarbon components of said feed and recycle streams; (3) separating said solid phase from said liquid raffinate phase; (4) recovering the hydrocarbon components from said solid phase; (5) recovering the hydrocarbon components from said liquid raffinate phase; (6) subjecting the hydrocarbon mixture recovered from said liquid raffinate phase to dealkylating conditions in the presence of hydrogen, an inert gas and a hydrogenation catalyst, whereby the ethylbenzene component of said hydocarbon mixture is dealkylated to lower boiling hydrocarbons and the xylene components of said hydrocarbon mixture are essentially unaffected; (7) subjecting the dealkylated product to isomerizing conditions in the presence of an isomerization catalyst, whereby there is formed an isomerizate comprising xylene isomers including para-xylene; (8) separating said xylene isomers from said isomerizate; and (9) returning at least part of the xylene isomers so separated to step (1) as said recycle stream.

2. The process of claim 1 wherein the dealkylation reaction set forth in step (6) is carried out in the vapor phase at a temperature between about 450° and about 550° C. at a liquid hourly space velocity between about 1.0 and about 10 volumes of feed per volume of catalyst per hour in the presence of between about 0.5 and about 10 moles of added hydrogen per mole of ethylbenzene and between about 1.0 and about 10 moles of an added inert gas per mole of ethylbenzene.

3. The process of claim 2 wherein the hydrogenation catalyst comprises molybdenum and cobalt oxides supported on activated alumina.

4. The process of claim 1 wherein the isomerization reaction set forth in step (7) is carried out in the liquid phase at a temperature between about 25° and about 200° C.

5. The process of claim 4 wherein the isomerization catalyst is a mixture of boron trifluoride and hydrogen fluoride.

6. The process of claim 1 wherein the antimony trihalide is antimony trichloride and is employed in an amount representing between about 0.5 and about 5 moles per mole of the combined feed and recycle streams.

7. The process of claim 1 wherein the hydrocarbon components of the said solid phase and the hydrocarbon components of the said liquid raffinate phase are recovered by distilling the respective phases under reduced pressure.

8. The process of claim 1 wherein the dealkylated product produced in step (6) is passed directly to step (7) without separation of the said lower-boiling hydrocarbons.

9. The process of claim 1 wherein between about 25 and about 75 percent of the dealkylated product produced in step (6) is recycled and combined with the hydrocarbon mixture supplied to step (6) from step (5).

10. The process which comprises (1) admixing a $C_8$ fraction of a petroleum hydrocarbon reformate comprising ortho-, meta-, and para-xylenes and ethylbenzene with a recycle stream hereinafter identified and with antimony trichloride at a temperature sufficient to effect the formation of a single liquid phase; (2) lowering the temperature of said liquid phase to a value such that there is formed a solid phase comprising antimony trichloride and hydrocarbon components of said reformate and recycle streams, the ratio of paraxylene to the other components of said solid phase being substantially higher than the ratio thereof in said reformate and recycle stream, and a liquid raffinate phase comprising antimony trichloride and hydrocarbon components of said reformate and recycle stream; (3) separating said solid phase from said liquid raffinate phase; (4) distilling the separated solid phase to recover therefrom a distillate rich in paraxylene; (5) distilling said liquid raffinate phase to recover therefrom a distillate lean in para-xylene; (6) vaporizing said distillate lean in para-xylene and contacting the vapor with a hydrogenation catalyst under dealkylating conditions such that the ethylbenzene is dealkylated to form products boiling substantially below the xylenes and the xylenes are essentially unaffected; (7) contacting the dealkylated product in the liquid phase with an isomerization catalyst under isomerizing conditions to obtain an isomerizate enriched in para-xylene; (8) distilling said isomerizate to recover therefrom a distillate having substantially the same boiling range as that of said reformate; and (9) returning the latter distillate to step (1) as said recycle stream.

11. The process which comprises (1) admixing a $C_8$ fraction of a petroleum hydrocarbon reformate comprising ortho-, meta- and para-xylenes and ethylbenzene with a recycle stream hereinafter identified and with between about 0.5 and about 5 moles of antimony trichloride per mole of said reformate and recycle streams; (2) heating the mixture to a temperature between about 40° and about 90° C. to effect the formation of a single liquid phase; (3) cooling said liquid phase to a temperature between about 0° C. and about 70° C. to effect precipitation of a solid phase; (4) separating said solid phase from the liquid from which it has been precipitated; (5) distilling said solid phase under reduced pressure to obtain an overhead fraction comprising hydrocarbon components of said reformate and recycle streams and enriched in para-xylene, and a bottoms fraction comprising antimony trichloride; (6) distilling the liquid from which said solid phase has been separated under reduced pressure to obtain an overhead fraction comprising hydrocarbon components of said reformate and recycle streams and lean in para-xylene, and a bottoms fraction comprising antimony trichloride; (7) returning said bottoms fractions to step (1); (8) vaporizing the overhead fraction obtained in step (6) and contacting the vapors in admixture with added hydrogen and an added inert gas with a hydrogenation catalyst at a temperature between about 450° C. and about 550° C. to effect dealkylation of the ethylbenzene component of said fraction without substantially affecting the xylene components of said fraction; (9) contacting the dealkylated product with an isomerization catalyst under isomerizing conditions; (10) distilling the isomerized product to obtain a fraction having a boiling range substantially the same as that of said reformate; and (11) returning said fraction to step (1) as said recycle stream.

12. The process of claim 11 wherein between about 25 and about 75 percent of the product obtained in step (8) is recycled and combined with the hydrocarbon mixture supplied to step (8) from step (6).

13. The process of claim 11 wherein, in step (8), between about 1.0 and about 5.0 moles of added hydrogen are provided per mole of ethylbenzene present, and the inert gas is steam provided in an amount representing between about 1.0 and about 10 moles per mole of ethylbenzene present.

14. The process of claim 11 wherein, in step (8), the hydrogenation catalyst comprises molybdenum and cobalt oxides supported on activated alumina.

15. The process of claim 11 wherein step (9) is carried out in the liquid phase at a temperature between about 25° and about 200° C.

16. The process of claim 11 wherein between about 25 and about 75 percent of the isomerized product obtained in step (9) is recycled and combined with the product supplied to step (9) from step (8).

17. The process of claim 11 wherein the dealkylated product obtained in step (8) is passed directly to step (9) without the removal therefrom of low-boiling constituents.

18. The process of claim 11 wherein the dealkylated product obtained in step (8) is distilled to recover a distillate essentially comprising isomeric xylenes, and said distillate is supplied to step (9).

19. The process which comprises (1) admixing a $C_8$ fraction of a petroleum hydrocarbon reformate comprising ortho-, meta- and para-xylenes and ethylbenzene with a first recycle stream hereinafter identified and with between about 0.5 and about 5 moles of antimony trichloride per mole of said reformate and recycle streams; (2) heating the mixture to a temperature between about 40° C. and about 90° C. to effect the formation of a single liquid phase; (3) cooling said liquid phase to a temperature between about 10° C. and about 40° C. to effect precipitation of a solid phase; (4) separating said solid phase from the liquid from which it has been precipitated; (5) distilling said solid phase under reduced pressure to obtain an overhead fraction comprising hydrocarbon components of said reformate and first recycle streams and enriched in para-xylene, and a bottoms fraction comprising antimony trichloride; (6) distilling the liquid from which said solid phase has been separated under reduced pressure to obtain an overhead fraction comprising hydrocarbon components of said reformate and first recycle streams and lean in para-xylene, and a bottoms fraction comprising antimony trichloride; (7) returning the bottoms fractions from steps (5) and (6) to step (1); (8) admixing the overhead fraction obtained in step (6) with a second recycle stream hereinafter identified and with between about 1.0 and about 5.0 moles of added hydrogen and between about 1.0 and 10 moles of steam per mole of ethylbenzene in said overhead fraction and said second recycle stream; (9) contacting the resulting mixture with a hydrogenation catalyst at a temperature between about 450° and about 550° C. under a pressure between about 100 and about 1500 p.s.i.g. at a liquid hourly space velocity between about 3.0 and about 8.0 volumes of liquid per volume of catalyst per hour, whereby the ethylbenzene component of said mixture is dealkylated and the xylene components of said mixture are substantially unaffected; (10) returning between about 25 and about 75 percent of the product obtained in step (9) to step (8) as said second recycle stream; (11) admixing the remainder of the product obtained in step (9) with a third recycle stream hereinafter identified; (12) contacting the resulting mixture with an isomerization catalyst at a temperature between about 25° and about 200° C. under a pressure sufficient to maintain liquid phase operation and over a period of time between about 5 and about 60 minutes; (13) returning between about 25 and about 75 percent of the product obtained in step (12) to step (11) as said third recycle stream; (14) distilling the remainder of the product obtained in step (12) to recover a fraction having a boiling range substantially the same as that of said reformate; and (15) returning at least a portion of said fraction to step (1) as said first recycle stream.

20. The process of claim 19 in which the hydrogenation catalyst comprises molybdenum and cobalt oxides supported on activated alumina, and the isomerization catalyst is a mixture of a Friedel-Crafts catalyst and a hydrogen halide.

References Cited in the file of this patent

UNITED STATES PATENTS

| | | |
|---|---|---|
| 2,258,726 | Atwell | Oct. 11, 1941 |
| 2,386,969 | Mattox | Oct. 16, 1945 |
| 2,431,515 | Shepardson | Nov. 25, 1947 |
| 2,532,276 | Birch et al. | Dec. 5, 1950 |
| 2,564,073 | Lien et al. | Aug. 14, 1951 |
| 2,564,388 | Bennett et al. | Aug. 14, 1951 |
| 2,652,438 | Arnold et al. | Sept. 15, 1953 |
| 2,656,397 | Holzman et al. | Oct. 20, 1953 |
| 2,662,925 | McCaulay et al. | Dec. 15, 1953 |
| 2,734,929 | Doumani | Feb. 14, 1956 |
| 2,768,220 | Nixon et al. | Oct. 23, 1956 |
| 2,768,222 | Nixon et al. | Oct. 23, 1956 |

FOREIGN PATENTS

| | | |
|---|---|---|
| 695,947 | Great Britain | Aug. 19, 1953 |

OTHER REFERENCES

International Critical Tables, vol. IV, first ed. (1928), pp. 192–193 and 196, pub. by McGraw-Hill Book Co., New York, N.Y.